(12) United States Patent
Imai et al.

(10) Patent No.: US 6,957,734 B2
(45) Date of Patent: Oct. 25, 2005

(54) WORK FIXING DEVICE

(75) Inventors: Junichi Imai, Gunma (JP); Yoshihito Aoyama, Gunma (JP)

(73) Assignee: Nisshinbo Industries, Inc, Tokyo (JP)

( * ) Notice: Subject to any disclaimer, the term of this patent is extended or adjusted under 35 U.S.C. 154(b) by 122 days.

(21) Appl. No.: 10/603,561

(22) Filed: Jun. 25, 2003

(65) Prior Publication Data

US 2005/0011733 A1    Jan. 20, 2005

(30) Foreign Application Priority Data

Jul. 3, 2002   (JP)  .............................. 2002-194629

(51) Int. Cl.[7] .............................................. B65G 15/00
(52) U.S. Cl. ................ 198/472.1; 198/805; 198/803.6; 198/867.04
(58) Field of Search .................... 198/468.5, 472.1, 198/817, 690.1, 688.1, 805, 867.04, 803.6

(56) References Cited

U.S. PATENT DOCUMENTS

| | | | | |
|---|---|---|---|---|
| 3,366,222 A | * | 1/1968 | Rowekamp | 198/634 |
| 3,581,873 A | * | 6/1971 | Spodig | 198/690.1 |
| 3,621,979 A | * | 11/1971 | Kraeft | 198/867.13 |
| 4,235,187 A | * | 11/1980 | Mirza | 118/58 |
| 4,315,568 A | * | 2/1982 | Mojden | 198/690.1 |
| 4,428,475 A | | 1/1984 | Barrett | |
| 4,643,298 A | * | 2/1987 | Wallaart | 198/805 |
| 4,742,906 A | * | 5/1988 | Wallaart | 198/805 |
| 4,805,761 A | * | 2/1989 | Totsch | 198/619 |
| 4,850,542 A | * | 7/1989 | Rechsteiner | 242/434.1 |
| 5,027,942 A | * | 7/1991 | Wallaart | 198/805 |
| 5,036,969 A | * | 8/1991 | Garbagnati | 198/805 |
| 5,165,527 A | * | 11/1992 | Garbagnati | 198/805 |
| 6,315,108 B1 | * | 11/2001 | Bootsman et al. | 198/690.1 |

FOREIGN PATENT DOCUMENTS

JP          61-69604          4/1986

* cited by examiner

Primary Examiner—Richard Ridley
(74) Attorney, Agent, or Firm—Muramatsu & Associates

(57) ABSTRACT

A work fixing device in which the load of the conveyor is not increased even when using a fixed magnet. The work fixing device comprises: plurality of plates, on each plate of the plurality of plates a work with a ferromagnetic portion being mounted; a transporter for endlessly connecting and circulating the plurality of plates; at least one machining head provided above the transporter, a magnet fixed to the transporter, the magnet fixing the work, which is transported by the transporter, through magnetic force on each plate of the plurality of plates within a working range of the machining head; and a nonmagnetic clearance holder for separating the magnet and the work from each other at a predetermined interval.

10 Claims, 5 Drawing Sheets

WORK FIXING DEVICE

FIELD OF THE INVENTION

The present invention relates to a device for fixing a work with a ferromagnetic portion such as a brake pad set comprising a steel backing plate and a brake pad (friction lining layer) adhered to the backing plate to perform machining such as grinding and cutting to the work.

DESCRIPTION OF THE RELATED ART

A brake pad set used for a disk brake of an automobile generally comprises a steel backing plate and a brake pad adhered to the backing plate. Pressing and heating powder material in which a fiber, a filler, and a binder are mixed form the brake pad. The disk brake reduces the speed of an automobile by pressing the brake pad to a steel rotor disk.

As described above, after the disk pad is adhered to the steel backing plate to form the disk pad set, the disk pad is ground to form inclined faces at both ends thereof, and becomes a finished product through several processes such as painting, stamping and sealing. Generally, the disk pad is transported on a conveyor to perform the processes in order.

When a disk pad set as a work reaches a position under a machining head, at the head, for example, a grinder lowers to grind the work to a predetermined shape. During the grinding, the work should be fixed and supported on the conveyor.

In order to fix the work on the conveyor, a mechanical clamp was conventionally used. But, the method is not suitable for mass production of the work since works should inefficiently be bolted one by one. Therefore, it was proposed that the works are fixed with magnets since the backing plate of the disk pad set is made of ferromagnetic steel. To be concrete, a plurality of plates made of magnetic metal may be attached to a chain conveyor to transport the works. In this case, the plates themselves are permanent magnets and the plates circulate. At a position of the conveyor after the machining is finished, the work must be separated from the plate. But, it is not easy to separate the plate since the plate is permanent magnet.

Then, it was proposed that permanent magnets were positioned under a rubber belt of a conveyor to fix works on the rubber belt since nonmagnetic rubber made it easy to remove the works from the conveyor. In this case, however, the elasticity of the rubber causes the work to move during machining, resulting in poor accuracy in the machining. Therefore, it was proposed that hard and ferromagnetic plates are replaced to electromagnets, and at a position where a work is removed from a conveyor, electric current is stopped to eliminate the magnetic force, which causes the work to easily be removed.

But, the above construction is not realized unless the electromagnets are movable. In a mechanism to move the electromagnets, contacts of electrodes must be slidable, thus wear of the contacts can be a serious problem. In addition, the electromagnet is heavy since it is provided with a coil, which increases load on the conveyor. Furthermore, these problems may shorten the life of the conveyor.

SUMMARY OF THE INVENTION

The present invention has been made to solve the above problems and it is an object of the present invention to provide a work fixing device in which the load of the conveyor is not increased without movable electromagnets. The work must be provided with a ferromagnetic portion.

To accomplish the above objective, a work fixing device according to the present invention comprises: plurality of plates, on each plate of the plurality of plates a work with a ferromagnetic portion being mounted; a transporter for endlessly connecting and circulating the plurality of plates; a magnet fixed to the transporter, the magnet fixing the work, which is transported by the transporter, through magnetic force on each plate of the plurality of plates; and a nonmagnetic clearance holder for separating the magnet and the work from each other at a predetermined interval.

In the above work fixing device, the plurality of plates may be nonmagnetic, and the clearance holder can be the plurality of plates themselves; the clearance holder may include a clearance between each plate of the plurality of plates and the magnet; and a slider can be inserted between each plate of the plurality of plates and the magnet.

Another work fixing device according to the present invention comprises: plurality of plates, on each plate of the plurality of plates a work with a ferromagnetic portion being mounted, each plate of the plurality of plates having a nonmagnetic portion and magnetic portions at both ends of the nonmagnetic portion; a transporter for endlessly connecting and circulating the plurality of plates; a magnet fixed to the transporter, the magnet fixing the work, which is transported by the transporter, through magnetic force on each plate of the plurality of plates; and a nonmagnetic clearance holder for separating the magnet and the work from each other at a predetermined interval.

In the work fixing device, the magnet may be accommodated in a C-shaped base having an opening at a position opposite to the nonmagnetic portion of each plate of the plurality of plates, and the nonmagnetic clearance holder can include a clearance between the C-shaped base and each plate of the plurality of plates; a slider may be inserted between each plate of the plurality of plates and the magnet; in the C-shaped base including the opening can be mounted a nonmagnetic magnet fixing member for fixing the magnet in the C-shaped base; the nonmagnetic portion of each plate of the plurality of plates can be a space; and the magnet can be a permanent magnet.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Now, preferred embodiments of the present invention will be explained with reference to drawings.

Figure 1:
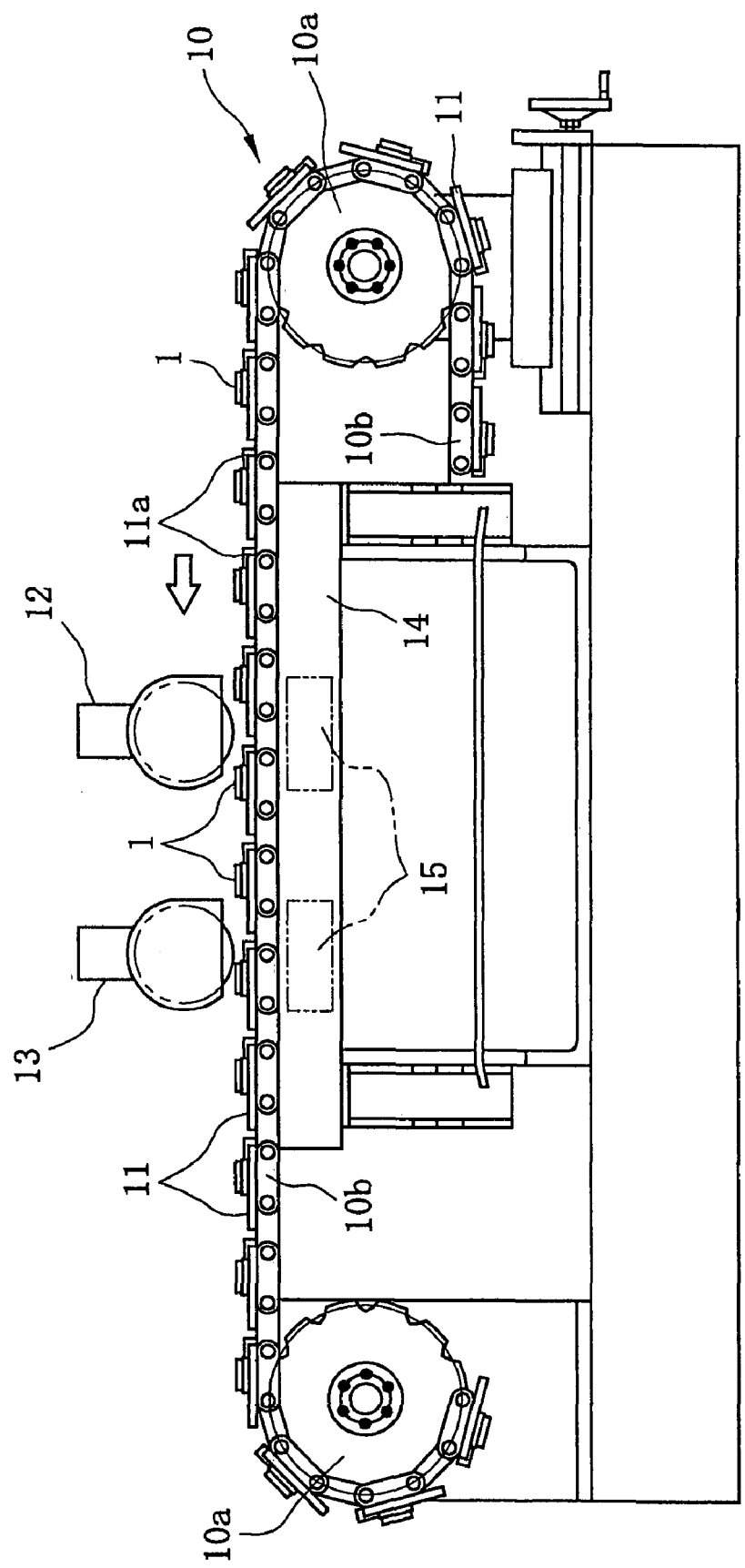
FIG. 1 is a plan view showing an overall construction of a work fixing device according to present invention.

FIG. 1 is a plan view showing an overall construction of a work fixing device according to present invention. A transporter 10 is provided with sprocket wheels 10a, 10a at both ends thereof and chains 10b, 10b between the sprocket wheels 10a, 10a, and a plurality of plates 11 is endlessly connected to respective links of the chains 10b, 10b.

The plates 11 are nonmagnetic. In place of the plates 11, as nonmagnetic material, nonmetal such as plastics including nylon and Teflon (registered trademark) and ceramics and nonmagnetic metal such as stainless steel, aluminum, copper and alloys of these metals may be used.

Figure 2:
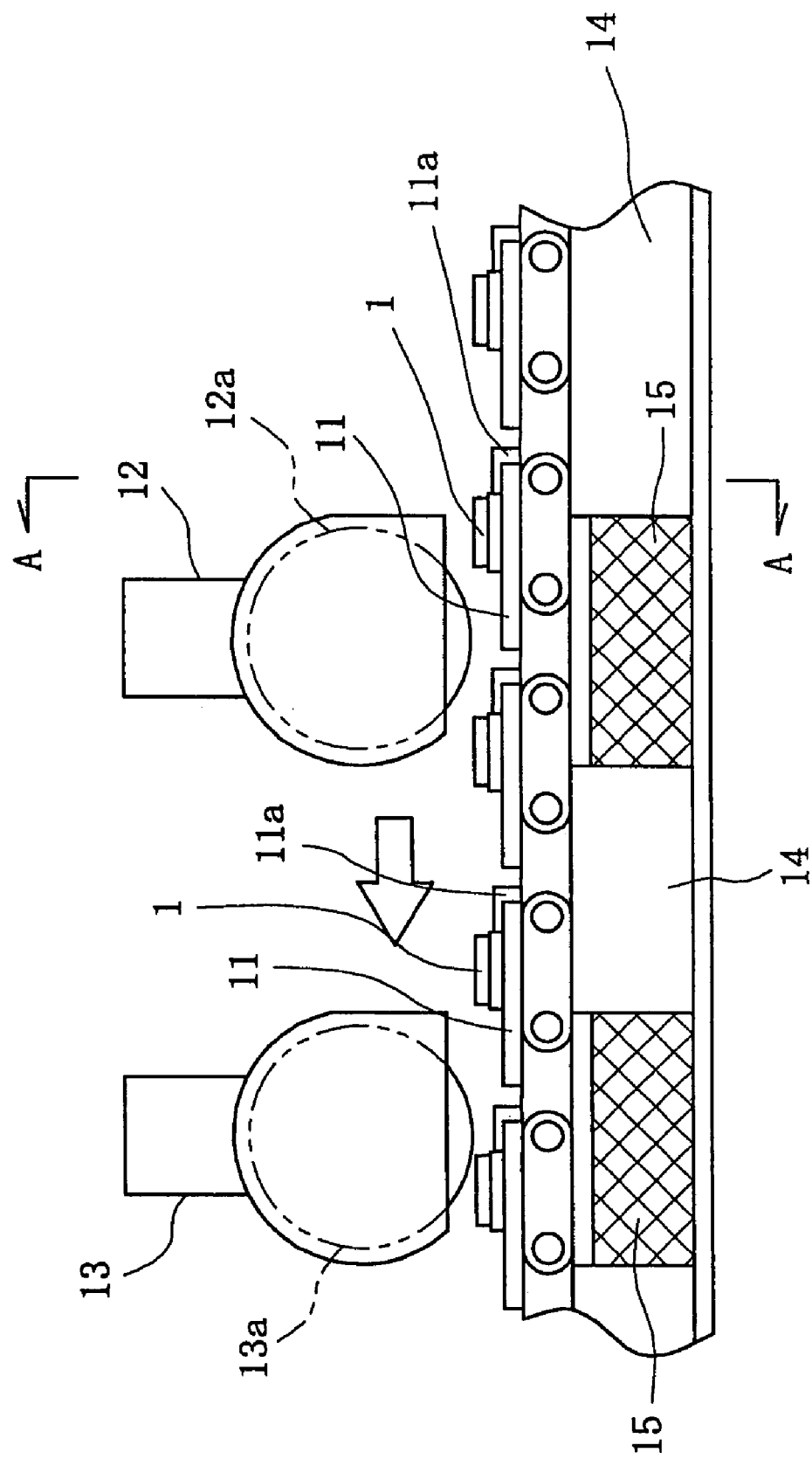
FIG. 2 is an enlarged view of two machining heads of the work fixing device shown in FIG. 1.

Two machining heads 12, 13 are mounted substantially upper center of the transporter 10. The first machining head 12 is a grinding head in this embodiment. The machining head 12 is, as illustrated in FIG. 2, provided with a rotary grinder 12a with a cylindrical grinding face. This rotary grinder 12a is used for finishing a friction face of a disk pad set as a work to be flat and for forming inclined faces at both ends of the friction face.

Figure 3:
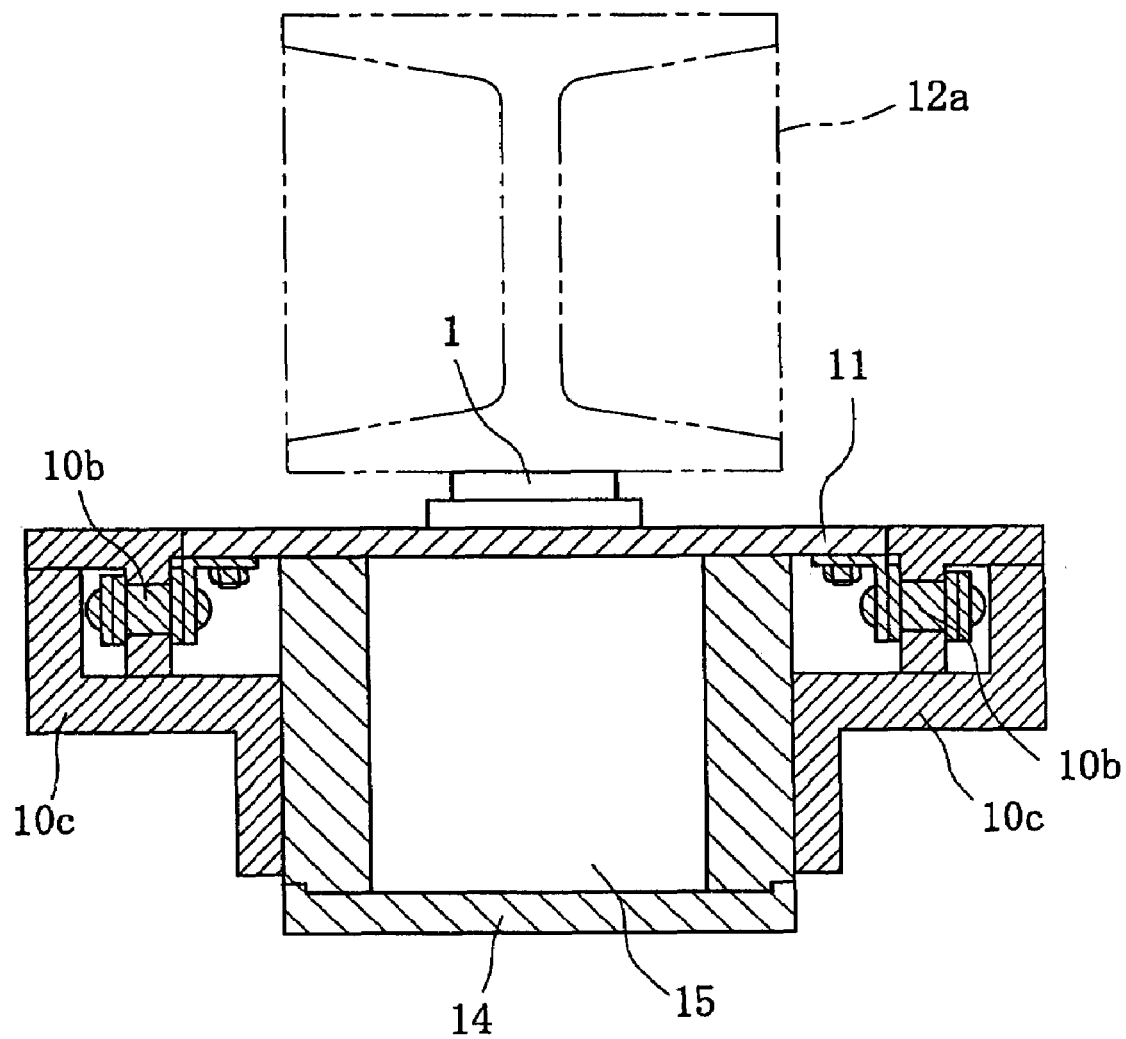
FIG. 3 is an enlarged cross-sectional view taken along the line A—A of FIG. 2.

The other machining head 13 is a channel forming head in this embodiment, which forms a channel, extending in a direction perpendicular to the rotation of a rotor disk, to the disk pad. The machining head 13 is provided with a thin disk-shaped rotary grinder 13a for cutting the channel. In place of the machining heads 12, 13, other heads for drilling, inspecting and stamping may be installed FIG. 2 is an enlarged view of the two machining heads 12, 13 shown in FIG. 1. FIG. 3 is an enlarged cross-sectional view taken along the line A—A of FIG. 2. As shown in these figures, the chain 10b of the transporter 10 is guided by conveyor guides 10c, 10c.

At an upper portion of the transporter 10 is installed a U-shaped base 14 made of magnetic body such as steel, and the conveyors guides 10c, 10c are fixed to the U-shaped base 14 at ends thereof. Tips of the U-shaped base 14 slightly contact with both ends of the plate 11 to prevent the plate 11 from meandering.

In the U-shaped base 14 is fixed a magnet 15. The magnet 15 has a length, in a direction that a work is transported, which covers the range that the machining heads 12, 13 function. As a result, while the machining heads 12, 13 machine the work 1 transported on the plate 11, the work 1 is continuously fixed.

The length of the magnet 15 in a direction that a work is transported is, as described above, determined so as to cover the range that the machining heads 12, 13 function. But, the length of the magnet 15 is to be longer than the above length. However, what the work 1 is absorbed and fixed means that the force becomes resistance against the transporter 10, so that the longer the length is, the more disadvantageous it becomes. Especially, at a position where the work 1 is removed from the transporter 10, it is important that the work 1 is not fixed by the magnetic force. In consideration of the above conditions, the length of the magnet 15 is determined.

In this embodiment, a permanent magnet is used as the magnet 15. Instead of the permanent magnet, an electromagnet can be used. This is because slidable contacts are not used since the magnet is fixed in the present invention. However, it is advantageous to adopt a permanent magnet since it allows the dimension of the magnet to be small, resulting in a smaller work fixing device. As a result, running costs such as power consumption can be reduced.

The work 1 is machined as described below. The rotation of the sprocket wheel 10a of the transporter 10 through a motor not shown allows the chain 10b to circulate, which further causes the plates 11 fixed to the links of the chain 10b to circulate. The work 1 is mounted on the plate 11 of the transporter 10 from a work supplier not shown. Several works can be mounted on one plate. At the rear end of the plate 11 is situated a pressure piece 11a, which pushes the rear end of the work 1 by the movement of the plate 11 to set the work 1 in a proper posture at a predetermined position on the plate 11. It is possible to separately mount a guide plate not shown or the like over the plate 11 to press the work 1 against the work peice 11a in a proper posture at a predetermined position on the plate 11. The work 1 starts movement while maintaining this condition.

When the transported work 1 reaches in the machining range of the machining head 12, the work 1 is subject to magnetic field of the magnet 15. Then, the work 1 is fixed on the plate 11, and the work 1 is subject to grinding by the machining head 12 and channel forming by the machining head 13 while it moves continuously. Hardness of the plate 11 prevents the movement of the work 1 in the machining processes. After the machining, the work 1 reaches by the transporter 10 to a position where the magnetic force of the magnet 15 does not influence, so that the work 1 is removed from the plate 11 with ease.

In the above embodiment, the U-shaped base 14 is made of magnetic body such as steel. As a result, when the conveyor guide 10c is made of steel, the magnet 15 also magnetizes the conveyor guide 10c, which may cause the plate 11 to be attracted. When the chain 10b is made of iron, the conveyor guide 10c attracts the chain 10b also. However, since the U-shaped base 14 is positioned between the conveyor guide 10c and the magnet 15, which means the conveyor guide 10c does not directly contact the magnet 15 but the conveyor guide 10c is considerably apart from the magnet 15, the influence of the magnetic force of the magnet 15 becomes small, which does not prevent the transportation of the plate 11. In addition, the conveyor guide 10c mainly contacts the roller of the chain 10b, therefore, the contact is a spot contact or a line contact, resulting in small attraction.

If the influence of the magnet 15 and the conveyor guide 10c to the movement of the transporter 10 is strong, the conveyor guide 10c can be formed of a nonmagnetic body. When the conveyor guide 10c is made of magnetic material, fixing the conveyor guide 10c to another member, which is not influenced by the magnet 15, not to the U-shaped base 14 can eliminate the influence of the magnetic force. Otherwise, the above problem may be resolved by locating a packing or the like at a position where the U-shaped base 14 and the conveyor guide 10c are connected with each other.

Figure 4:
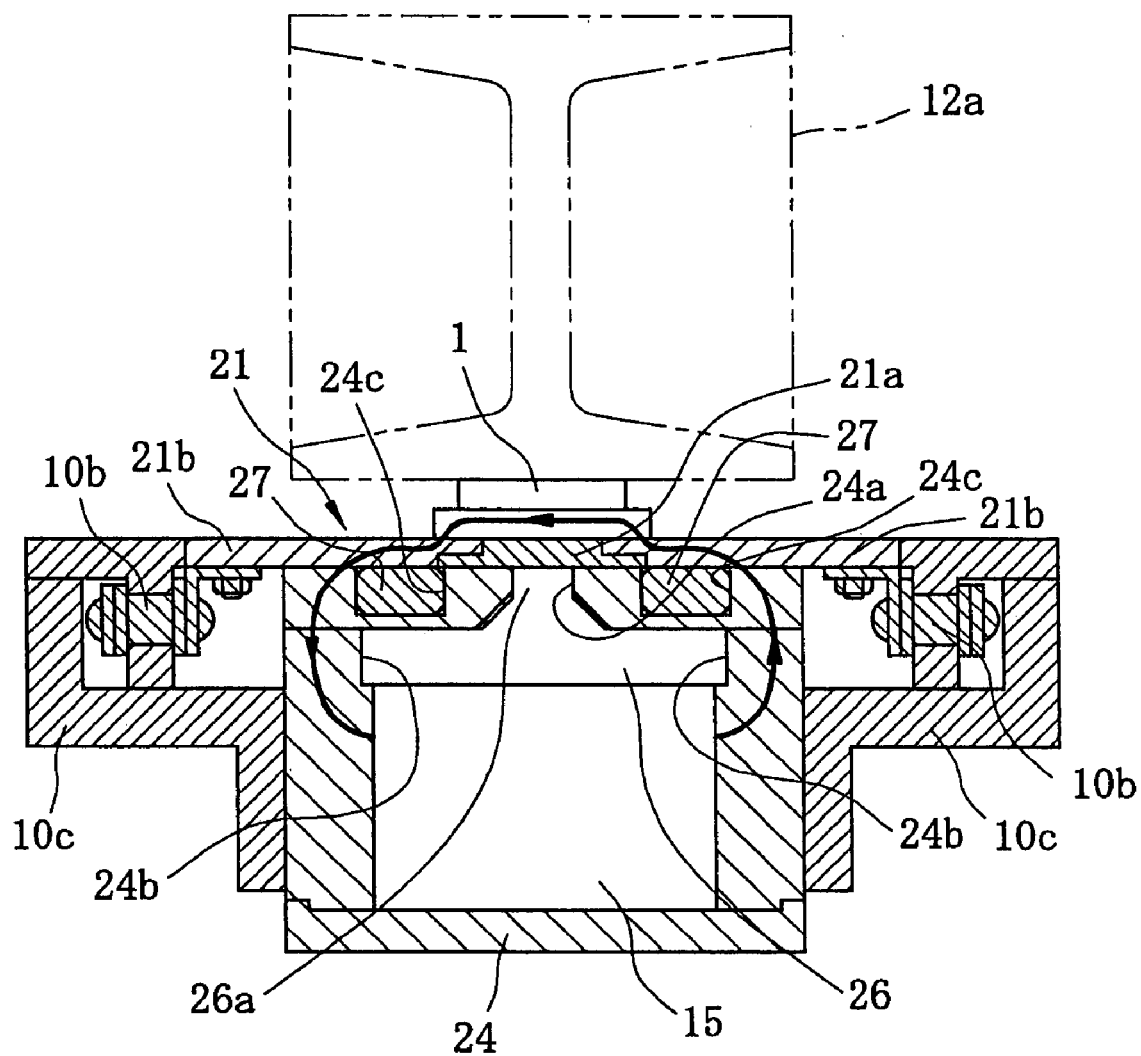
FIG. 4 shows a work fixing device according to the second embodiment of the present invention.

FIG. 4 shows the second embodiment of the present invention. In this embodiment, a plate 21 is provided with a nonmagnetic portion 21a at the center thereof, and magnetic portions 21b, 21b at both ends thereof, and these portions are integral with each other through bonding agent or the like. The nonmagnetic portion 21a may be a nonmetal such as plastics including nylon and Teflon (registered trademark) and ceramics and nonmagnetic metals such as stainless steel, aluminum, copper and alloys of these metals. The magnetic portion 21b is steel in this embodiment. Generally, the work 1 is not mounted on the nonmagnetic portion 21a. But, the nonmagnetic portion 21a is preferably not soft but hard and strong to secure desired rigidity.

A C-shaped base 24 is adopted, which is not U-shaped. That is, in FIG. 4, the right and left sides and the bottom are closed, and at a position opposite to the upper nonmagnetic portion 21a is formed an opening 24a. The magnet 15 is fixed at a bottom of the inner space. Tiered portions 24b, 24b are formed on the both side walls of the C-shaped base 24 so as to be opposite to the upper face of the magnet 15. To the tiered portions 24b, 24b is fixed a nonmagnetic magnet fixing member 26, which allows the magnet 15 to be fixed to the bottom of the C-shaped base 24. As nonmagnetic material, the above-mentioned plastics, ceramics and nonmagnetic metals may be used.

A rib 26a is formed on the upper portion of the magnet fixing member 26, and the rib 26a closes the opening 24a of the C-shaped base 24. An end face of the rib 26a and the upper face of the opening 24a of the C-shaped base 24 are flush with each other.

Figure 5:
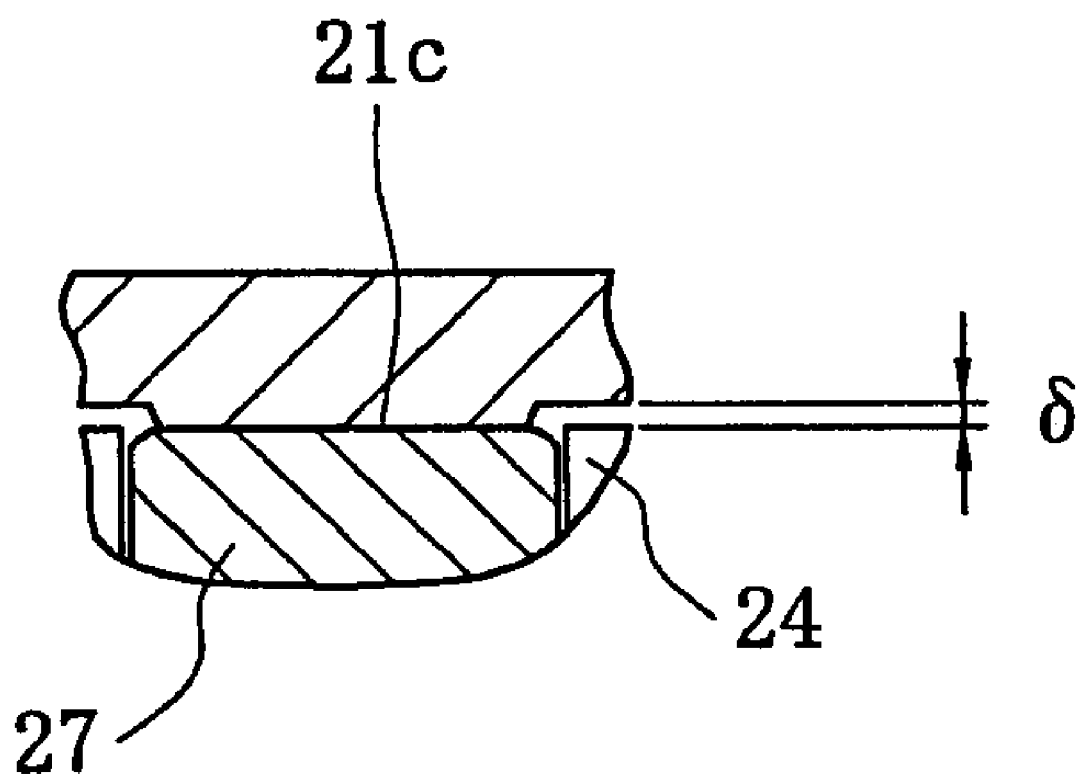
FIG. 5 an enlarged partially cross-sectional view of a part between a slider and a plate of the work fixing device shown in FIG. 4.

Concave portions 24c, 24c are formed on the upper face of the C-shaped base 24 in opposition to the plate 21. A slider 27 is inserted in the concave portions 24c, 24c. FIG. 5 is an enlarged partially cross-sectional view of a part between the slider 27 and the plate 21. As illustrated in this figure, a slightly projecting contact portion 21c is formed on the plate 21 at a position opposite to the slider 27, and the contact portion 21c contacts the slider 27 to secure a clearance δ, which prevents the plate 21 from directly contacting the C-shaped base 24. Magnetic or nonmagnetic material, nonmetal or metal can be used for the slider 27. In this case, the slider 27 plane-contact the plate 21. PV value (P: maximum permissible load [N/mm²], V: maximum permissible velocity [m/sec]) of the slider 27 is preferably equal to or greater than 0.3, and is more preferably equal to or greater than 0.50. For instance, oil-impregnated metal, cast iron and sintered metal containing solid lubricant such as graphite, tungsten and molybdenum can be used for the plate.

The slider 27 may be constructed with at least one ball or roller. The slider 27 made of magnetic material generates attracting force due to magnetic force. But, when the slider 27 is a ball or a roller, the slider 27 spot-contacts or line-contacts the plate 21, so that the attracting force is small, which does not affect the transportation by the plate 21. Even if the slider 27 and the plate 21 plane-contact with each other, it is possible to reduce the attracting force to an extent that the force does not affect the transportation by the plate 21 since the contact area between the slider 27 and the plate 21 is small and these materials are slippery. In addition, other construction may be adopted, for example, instead of the contact portion 21c, the slider 27 can be provided with a projecting portion to secure the clearance δ at the contact portion between them. In order to prevent dust or the like from coming into the clearance δ, a scraper or an air blower is preferably installed.

By the way, the C-shaped base 24 is a magnetic body and closely contacts with the magnet 15, so that the C-shaped base 24 is magnetized. Therefore, the both ends of the opening 24a of the C-shaped base 24 become magnetic poles of the magnet 15. However, the plate 21 does not directly contact the magnet 15 as a matter of course nor the opening 24a.

That is, the C-shaped base 24 opposes to the magnet fixing member 26 at the opening 24a, to the rib 26a at both ends of the opening 24a, to the contact portions 21c, 21c at outer portions of the both ends of the opening 24a, to the plate 21 through the clearance δ between them at further outer portions of the both ends of the opening 24a, so that the magnetized C-shaped base 24 has no portion directly contacting the magnetic portion 21b of the plate 21, which reduces the load of transportation of the transporter 10.

The rotation of the transporter 10 allows the plate 21 to circulate. The work 1 is mounted on the plate 21 of the transporter 10 from a work supplier not shown. At the rear end of the plate 21 is formed the same pressure piece as the pressure piece 11a shown in FIG. 3, and the movement of the plate 21 sets the work 1 in a proper posture at a predetermined position on the plate 21.

When the transported work 1 reaches in the machining range of the machining head 12, the work 1 is subject to magnetic field produced by the magnet 15. Then, a magnetic path is formed from one magnetic pole (for instance, right one in the figure) of the magnet 15 to the right side of the C-shaped base 24, the right magnetic portion 21b of the plate 21, the ferromagnetic portion (backing plate) of the work 1, the left magnetic portion 21b of the plate 21, the left side of the C-shaped base 24 and the other magnetic pole (left one in the figure) of the magnet 15 in this order. This magnetic path allows the work 1 to securely be attracted to the magnet 15. Under the condition, the work 1 is fixed on the plate 21, and is subjected to grinding by the machining head 12 or channel forming by the machining head 13 while it moves continuously. Hardness of the plate 21 prevents the movement of the work 1 in the machining processes. After the machining, the work 1 reaches by the transporter 10 to a position where the magnetic force of the magnet 15 does not influence, so that the work 1 is easily removed from the plate 21.

The machining heads are mounted in this embodiment at the two positions as indicated by the references 12 and 13. At least one head may be mounted; the number of the heads is not limited in this invention. The head or heads are used for sealing, stamping and inspecting other than grinding and channel-shaping as described above. In addition, in this embodiment, the work 1 is subject to the machining by the heads 12, 13 while being moved by the transporter 10. However, it is possible to intermittently move the work 1 by the transporter 10. That is, when the work 1 reaches under the machining head 12 or the machining head 13, the work 1 stops at the position until the machining is finished, then the work 1 is transported to the other head and stops there.

In the above embodiment, the work 1 is mounted on the plate 11, 21 such that the brake pad of the work 1 becomes upside and the backing plate as a ferromagnetic portion downside. However, if the magnetic force of the magnet 15 is permissible, the work 1 may be mounted on the plate 11, 21 such that the backing plate becomes upside and the brake pad downside in a manner opposite to the above.

Under the condition that the work 1 is fixed by the magnet 15, the attracting force works against the transporter 10. But, the load is produced only for fixing the work 1; therefore it is small in relation to total weight of the transporter 10 with the plate 11, 21. Accordingly, there is not much difference between the case that the transporter 10 moves without machining and the case that the transporter 10 moves while the work 1 is machined by the all heads 12, 13. Tn the present invention, since a large electromagnet with a coil is not required and the magnet 15 is fixed, the load of the transporter 10 can remarkably be reduced. In addition, slidable contacts that are essential to a movable electromagnet become unnecessary, resulting in long life of the transporter 10.

The present invention is not limited to the above embodiments. In this invention, the work 1 transported by the transporter 10 can be fixed under the machining head 12, 13 by the magnet 15, and at the same time, the work 1 and the magnet 15 do not directly contact with each other, and the work 1 does not move during the machining. If the work 1 and the magnet 15 directly contact with each other, resistance and wear due to friction will increase. Therefore, a nonmagnetic clearance holder is formed between the magnet 15 and the work 1. The magnet in the above construction is not limited to the magnet 15 in the figure since if a magnetic body is attracted to the magnet 15, the magnetic body is also magnetized to be a magnet. In this invention, when the U-shaped base 14 and the C-shaped base 24 are made from magnetic material, the bases 14, 24 actually become magnets since the magnet 15 magnetizes them. The ferromagnetic portion of the work 1 is allowed not to directly contact these magnets through the nonmagnetic clearance holder. The clearance holder is plates 11 themselves in the embodiment shown in FIG. 3. In the embodiment shown in FIG. 4, the clearance holder is the combination of the central nonmagnetic portion 21*a*, magnet fixing member 26 and the clearance δ.

In the embodiment shown in FIG. 3, the magnet 15 and the U-shaped base 14 directly contact the plate 11. However, it is preferable that the clearance δ as a clearance holder is maintained between the plate 11 and the magnet 15, and the plate 11 and the U-shaped base 14 since slide resistance can be reduced. Inserting the slider 27 at the contact portion can further reduce the slide resistance.

In the embodiment shown in FIG. 3, the plate 11 can be a magnetic body. In such a case, a nonmagnetic clearance holder must be inserted between the magnet 15 and the plate 11 since the magnet 15 directly absorbs the plate 11. As the clearance holder, the slider 27 or the like can secure the clearance δ, or a nonmagnetic member may be disposed between the plate 11 and the magnet 15.

In the above embodiments, although the U-shaped base 14 and the C-shaped base 24 are magnetic bodies, both of them may be nonmagnetic. Especially, when the C-shaped base 24 is made from nonmagnetic material, it becomes unnecessary to secure the clearance δ, which allows the slider 27 and the contact portion 21*c* to be omitted. However, when the slider 27 and the like are mounted and the clearance δ is maintained, transportation load may be reduced.

Further, whether the U-shaped base 14 and the C-shaped base 24 are magnetic or nonmagnetic is not essential so long as the magnet 15 incorporated in the work fixing device is short, and the shape of the bases is not limited. For example, the base may be a mere plate or a hollow rectangular base without an opening 14*a*.

In the embodiment shown in FIG. 4, at least one of the rib 26*a* of the magnet fixing member 26 and the nonmagnetic portion 21*a* of the plate 21 may be hollow. Although the nonmagnetic portion 21*a* becomes hollow, if only the work 1 is mounted on the magnetic portions 21*b*, 21*b* on the both sides and the plate 21 is securely supported, the movement of the work 1 caused by the pressure due to the machining of the machining head 12, 13 can be prevented.

As described above, the work fixing device according to the present invention comprises: plurality of plates, on each plate of the plurality of plates a work with a ferromagnetic portion being mounted; a transporter for endlessly connecting and circulating the plurality of plates; a magnet fixed to the transporter, the magnet fixing the work, which is transported by the transporter, through magnetic force on each plate of the plurality of plates; and a nonmagnetic clearance holder for separating the magnet and the work from each other at a predetermined interval. With this construction, when the transporter transports the work and it reaches a position to be machined, the magnet fixes the work during the machining. Since the magnet is fixed, even if an electromagnet is adopted, contacts of electric poles need not be slidable, which results in no problem on wear of the electric poles. Further, a clearance holder separates the work and the magnet from each other, thus, the load of transportation applied to the transporter is reduced. In addition, since the clearance by the clearance holder is constant, the work does not move during the machining. After machining, the work is transported to a position where the magnetic force of the magnet will not reach, which allows the work to be removed from the transporter with ease.

When the plate is provided with a nonmagnetic portion and magnetic portions at both ends of the nonmagnetic portion, and a nonmagnetic clearance holder separates the magnet and the work from each other at a predetermined interval, a closed magnetic path is formed among the magnetic portions at both ends of the nonmagnetic portion, the ferromagnetic portion of the work and the magnet, which increases attracting force by the magnet.

When the magnet is accommodated in a C-shaped base having an opening at a position opposite to the nonmagnetic portion of each plate of the plurality of plates, and a slider is mounted at both ends of the opening to keep a predetermined clearance between the C-shaped base and the each plate of the plurality of plates, the magnetic portion of the plate does not directly contact the magnet nor the C-shaped base, which further reduces the transportation load.

What is claimed is:

1. A work fixing device comprising:
   plurality of plates, a work with a ferromagnetic portion being mounted on each plate of said plurality of plates;
   a transporter for endlessly connecting and circulating said plurality of plates;
   at least one machining head provided above said transporter;
   a magnet fixed to said transporter, said magnet fixing the work to said plate transported by the transporter by attracting the work by its magnetic force within a working range of said machining head; and
   a nonmagnetic clearance holder for separating the magnet and the work from each other at a predetermined interval;
   wherein the work is removed from said plate at a removal area where said magnetic force by said magnet will not sufficiently attract said work.

2. The work fixing device as claimed in claim 1, wherein said plurality of plates are nonmagnetic, and said clearance holder is said plurality of plates themselves.

3. The work fixing device as claimed in claim 1, wherein said clearance holder includes a clearance between each plate of said plurality of plates and the magnet.

4. The work fixing device as claimed in claim 3, wherein a slider is inserted between each plate of said plurality of plates and the magnet.

5. A work fixing device comprising:
   plurality of plates, on each plate of said plurality of plates a work with a ferromagnetic portion being mounted, each plate of said plurality of plates having a nonmagnetic portion and magnetic portions at both ends of the nonmagnetic portion;
   a transporter for endlessly connecting and circulating said plurality of plates;
   a magnet fixed to said transporter, said magnet fixing the work, which is transported by the transporter, through magnetic force on each plate of said plurality of plates; and
   a nonmagnetic clearance holder for separating the magnet and the work from each other at a predetermined interval.

6. The work fixing device as claimed in claim 5, wherein said magnet is accommodated in a C-shaped base having an opening at a position opposite to the nonmagnetic portion of each plate of said plurality of plates, and said nonmagnetic clearance holder includes a clearance between the C-shaped base and each plate of said plurality of plates.

7. The work fixing device as claimed in claim 6, wherein a slider is inserted between each plate of said plurality of plates and the magnet.

8. The work fixing device as claimed in claim 6, wherein in said C-shaped base including the opening is mounted a nonmagnetic magnet fixing member for fixing the magnet in the C-shaped base.

9. The work fixing device as claimed in claim 5, wherein said nonmagnetic portion of each plate of said plurality of plates is a space.

10. The work fixing device as claimed in claim 1, wherein said magnet is a permanent magnet.

* * * * *